United States Patent [19]

Kistler

[11] Patent Number: 4,596,155
[45] Date of Patent: Jun. 24, 1986

[54] ISOTROPIC STRAIN SENSOR AND LOAD CELL EMPLOYING SAME

[75] Inventor: Walter P. Kistler, Bellevue, Wash.

[73] Assignee: Kistler-Morse Corporation, Redmond, Wash.

[21] Appl. No.: 566,047

[22] Filed: Dec. 27, 1983

[51] Int. Cl.⁴ ............................ G01L 1/22; G01B 7/18
[52] U.S. Cl. .................................. 73/862.65; 73/781; 338/5
[58] Field of Search .................. 73/760, 763, 765, 767, 73/862.65–862.67, 781; 338/2–6

[56] References Cited

U.S. PATENT DOCUMENTS

| | | | |
|---|---|---|---|
| 3,341,794 | 9/1967 | Stedman | 73/862.67 X |
| 3,698,495 | 10/1972 | Vogt | 73/862.67 X |
| 3,706,349 | 12/1972 | Paelian et al. | 73/862.65 X |
| 3,995,476 | 12/1976 | Hoffman | 73/767 |

FOREIGN PATENT DOCUMENTS 2930520 2/1981 Fed. Rep. of Germany ........ 73/760

Primary Examiner—Charles A. Ruehl
Attorney, Agent, or Firm—Seed and Berry

[57] ABSTRACT

An isotropic strain sensor having four mounting points interconnected by four legs, two of which are bowed toward each other and two of which are bowed away from each other. A strain sensing element mounted on at least one of the legs provides an electrical indication of the deflection of the leg. As a result, the strain sensor measures isotropic strains in an object to which the strain sensor is attached through the mounting points. Another embodiment of the strain sensor utilizes three mounting points interconnected by legs, two of which are bowed outwardly and one of which is bowed inwardly. Both embodiments of the strain sensor produce outputs that are a nonlinear function of the sensed isotropic strain. This nonlinear characteristic allows the strain sensor to provide an output that is a linear function of the load applied between the center and outer periphery of a freely supported disc that has a strain that is a nonlinear function of the applied load.

20 Claims, 12 Drawing Figures

ISOTROPIC STRAIN SENSOR AND LOAD CELL EMPLOYING SAME

TECHNICAL FIELD

This invention relates to certain sensors and more particularly, to an isotropic strain sensor for measuring the load-induced strain in a structural member.

BACKGROUND ART

Electromechanical force transducers, known as "load cells," have long been used in a variety of load-measuring applications. In load cells, a load is usually applied to a structural member, and strain sensors of various designs are then secured to the structural member. The structural member deforms as a known function of the applied force, and this deformation or strain is measured by the strain sensor. The strain sensor generally provides an electrical output which is thus an indication of the load or force applied to the structural member.

In applications where the shape and other characteristics of the structural member are well defined, conventional strain sensors mounted on the structural member provide highly accurate results. However, in other applications, characteristics of the structural member, such as its shape or deflection characteristics, are not well defined. Under these circumstances, the load-induced strain, even if it can be accurately measured, does not provide an accurate indication of the load carried by the structural member, since the magnitude of the strain for a given force is not known.

One technique for measuring the load applied to a structural member having characteristics that are not well defined is to support the load with a structural member having well-defined characteristics. While this will, of course, provide accurate results, such techniques nevertheless have several inherent disadvantages. First, mounting the load bearing structure on a structural member can often require a great deal of machining to properly connect the structural member to the load-bearing structure. Second, the structural member having well-defined characteristics undesirably increases the size and/or weight of the overall structure. Third, structural members having well-defined characteristics do not often match the structure that they are supporting, so the overall combination can be quite unsightly. Other disadvantages of supporting a load-bearing structure on a structural member having well-defined characteristics will be apparent to one skilled in the art.

In order to minimize the disadvantage of supporting a load with a structural member having well-defined characteristics, attempts have been made to utilize a relatively thin disc as the load-bearing structural member and then measure the load-induced strain in the disc to provide an electrical indication of the load. Such discs have the advantage of being compact, lightweight and relatively inobtrusive. However, discs deflect in a nonlinear manner so that conventional strain gauges providing an electrical output in proportion to the strain produce an electrical output that is a nonlinear function of the applied load. As a result, such load cells cannot be used without either manual or automatic conversion or linearization of the output signal. In the case of manual linearization, in which the load is determined by look-up tables, linearization is time-consuming and error prone. In the case of automatic linearization, the linearizing circuitry can significantly increase the cost of such load cells.

DISCLOSURE OF THE INVENTION

It is an object of the invention to provide a load cell that can be used to support a structure and which is compact and light in weight.

It is still another object of the invention to provide a load cell for supporting a structural member that is inobtrusive so that it does not adversely affect the appearance of the combined structure.

It is a further object of the invention to provide a disc-type load cell that generates an electrical output that is a linear function of the applied load.

It is a still further object of the invention to provide an isotropic strain sensor that generates an electrical output that is a nonlinear function that compensates for the nonlinear relationship between the applied load and deflection of a load-receiving disc.

It is another object of the invention to provide an isotropic strain sensor that is substantially insensitive to nonisotropic strains.

These and other objects of the invention are provided by a strain sensor having at least three mounting members interconnected by respective nonlinear legs. The legs connecting at least one of the mounting members to the adjacent mounting members curve in opposite directions so that the legs deflect in opposite directions responsive to isotropic movement of respective mounting points formed on the mounting members. A strain-sensing element mounted on at least one of the legs provides an electrical indication of the deflection of the leg. As a result, isotropic movement of the mounting points causes the mounting members at opposite ends of the strain-instrumented leg to rotate in opposite directions. The resulting deflection of the strain-instrumented leg is a nonlinear function of the isotropic strain.

Any number of mounting members and interconnecting legs can be employed in the strain sensor, but strain sensors employing three or four mounting members in interconnecting legs are preferred. Interconnecting legs connected to the same mounting member preferably curve in opposite directions. However, strain sensors employing odd numbers of mounting members and interconnecting legs inherently require that at least one pair of adjacent interconnecting legs curve in the same direction. In such cases, the mounting member positioned therebetween is preferably somewhat flexible about its mounting point so that portions of the mounting member on opposite sides of the mounting point are free to deflect in opposite directions.

The interconnecting legs may or may not have mounted thereon a strain-sensing element. Where a strain-sensing element is not mounted on an interconnecting leg, a flexure hinge is preferably formed at its midpoint.

The strain sensor can be advantageously employed in a load cell in which the strain sensor is mounted on a disc of resilient material adapted to receive opposed forces applied between the center of the disc on one surface and a line symmetrically spaced from the center of the disc on the opposite surface. The strain sensor is mounted at the center of the disc on one of its surfaces. Insofar as the strain sensor generates an electrical signal having a characteristic that is a nonlinear function of the strain in the disc, and the nonlinear function can be made to correspond to the nonlinear deflection characteristics of the disc, the strain sensor can generate an electrical output having a characteristic that is a relatively linear function of the force applied to the disc.

The disc is preferably formed by a cylindrical body having a spacer positioned at its center on the surface opposite the surface on which the strain sensor is mounted and a rim surrounding at least a portion of the body and extending axially away from the spacer. The load cell also includes a load-bearing member having a rim that extends toward and is connected to the rim of the disc. The rims thus, together, surround the strain sensor and couple an opposed force applied between the spacer of the disc and the load-bearing member to the disc. The isotropic strain sensor, by generating an electrical output that compensates for the nonlinear deflection characteristics of the disc, allows the compact, lightweight and inobtrusive characteristics of the disc to be employed without the need for linearization of the load cell output.

BEST MODE FOR CARRYING OUT THE INVENTION

Figure 1:
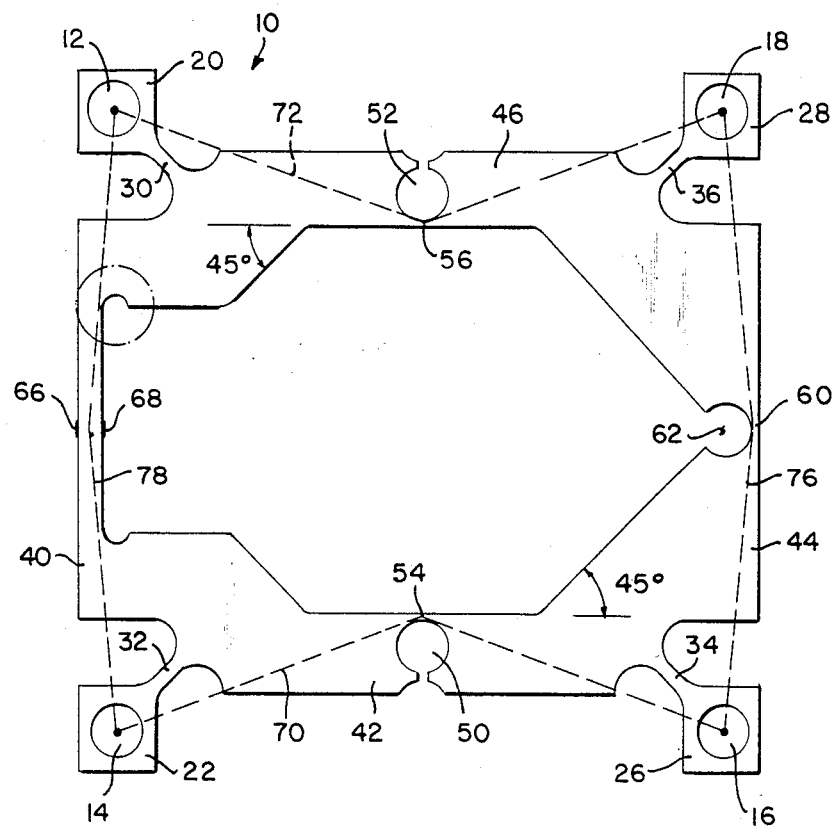
FIG. 1 is a top plan view of one embodiment of the isotropic strain sensor employing four mounting points.
Figure 2:
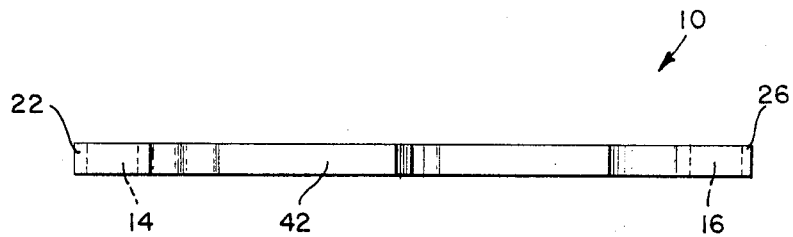
FIG. 2 is a side elevational view of the strain sensor of FIG. 1.

One embodiment of an isotropic strains sensor is illustrated in FIGS. 1 and 2. The strain sensor 10 illustrated in FIGS. 1 and 2 is formed from a square plate of resilient material, such as steel, preferably by machining. Four mounting holes 12-18 are formed in respective mounting pads 20-28 at the corners of the square plate. The mounting pads are connected to the remainder of the strain sensor by respective flexures 30-36. The remainder of the strain sensor is formed by four side pieces or interconnecting legs 40-46. Circular cutouts 50, 52 are formed in respective legs 42, 46 to produce respective flexure hinges 54, 56. It is important to note that the flexure hinges 54, 56 are formed at respective points to the inside of a line connecting the mounting holes 12, 18 and 14, 16, respectively. Although the flexure hinges 54, 56 have been formed by a circular cutout in the embodiment of FIGS. 1 and 2, it will be understood that the flexures 54, 56 may be formed by any other suitable technique.

The interconnecting leg 44 also has a flexure hinge 60 formed therein by a circular cutout 62. However, unlike the flexure hinges 54, 56 in the legs 42, 46, respectively, the flexure hinge 60 in the leg 44 is positioned to the outside of a line connecting the mounting holes 16, 18.

The final interconnecting leg is of the configuration of a beam 40 and thus has no flexure hinge formed therein. However, conventional strain gauges 66,68 are formed on opposite surfaces of the beam 40 to measure the deflection of the beam 40. It is important to note that the center of the beam 40 at its midpoint is to the outside of a line connecting the mounting holes 12, 14.

The configuration of the flexure hinges 54, 56, 60 and the beam 40 thus produces four respective curved legs, which are illustrated schematically as 70-78, respectively. It is important that the legs 70, 72 curving inwardly are positioned between the legs 76, 78 curving outwardly. As explained in greater detail below, it is this configuration that causes the beam 40 to deflect responsive to isotropic strains in a structure on which the sensor 10 is mounted through mounting holes 12-18.

Figure 3A:
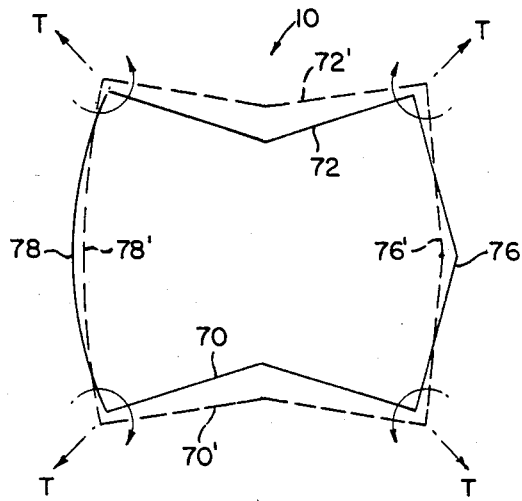
FIGS. 3A-C are schematics illustrating the deflection of the isotropic strain sensor for isotropic and nonisotropic strains.

The isotropic strain sensor of FIGS. 1 and 2 is illustrated in schematic form in FIG. 3A in its isotropic tensioned condition. In the isotropic tensioned condition, the mounting points 12-18 are tensioned in both the vertical and horizontal directions, resulting in a tensional strain vector T on each mounting point 12-18. The tension causes the inwardly curved leg 72 and the beam 70 to straighten toward the positions 72' and 70', respectively. At the same time, the tension causes the outwardly curved legs 78, 76 to move inwardly toward a straight condition 76', 78', respectively. The outward movement of the leg 72' causes the portion of the leg 72' connected to mounting point 18 to rotate in the clockwise direction. At the same time, the inward movement of the leg 76' causes the portion of the leg 76' connected to the mounting point 18 to also curve clockwise. As a result, the corner of the strain sensor 10 formed by the portion of leg 46 (FIG. 1) to the right of flexure 56 and the portion of leg 44 above flexure 60 rotates in a clockwise direction. The flexure 36 allows the corner piece to pivot freely, even though the mounting pad 28 is fixedly secured to the underlying structure through mounting hole 18. The center of curvature of the corner piece is at the approximate center of the flexure 36.

In a similar manner, the corner piece formed by the interconnecting leg 44 below the flexure 60 and interconnecting leg 42 to the right of flexure 54 rotates in a counterclockwise direction. Finally, the corner piece connected to flexure 30 rotates in a counterclockwise direction while the corner piece connected to flexure 32 rotates in a clockwise direction. The rotational moments coupled to the ends of the beam 40 causes the beam to bend inwardly, as illustrated in FIG. 3A, thus providing an indication of an isotropic tensional strain. It is important to note that the rigidity of each corner piece prevents the angle between adjoining interconnecting legs from varying. However, because the inwardly and outwardly curving interconnecting legs alternate with each other, adjoining portions of adjacent interconnecting legs rotate in the same direction so that there is no force attempting to bend each corner piece.

Figure 3B:
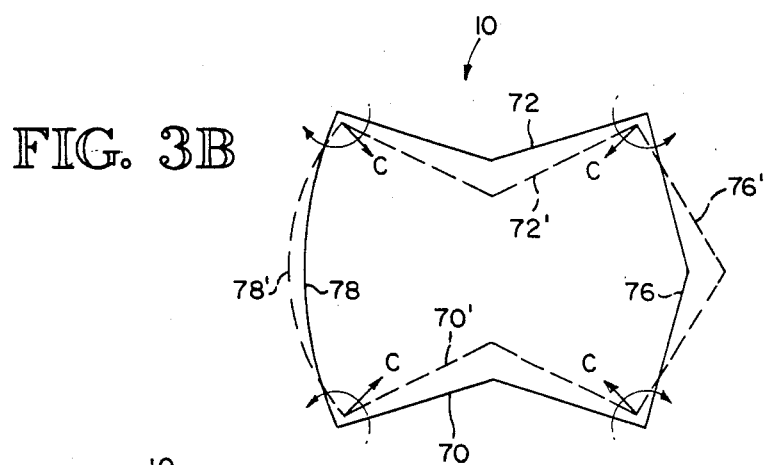

The response of the isotropic strain sensor of FIGS. 1 and 2 to compressional strains is illustrated in FIG. 3B. All of the interconnecting legs 70-76 and the beam 78 increase in curvature as a result of the compression. The inwardly curving legs 70, 72 thus bend further inwardly to the positions 70', 72'. The outwardly curving leg 76 and the outwardly curving beam 78 bend further outwardly to the positions 76', 78', respectively. As a result, the corner pieces at the upper right-hand and lower left-hand corners rotate in a counterclockwise direction while the corner pieces in the upper left-hand and lower right-hand corners rotate in a clockwise direction. The opposed moments applied to the beam 78 bend the beam outwardly to the position 78', thus providing an indication of isotropic compressional strain.

Figure 3C:
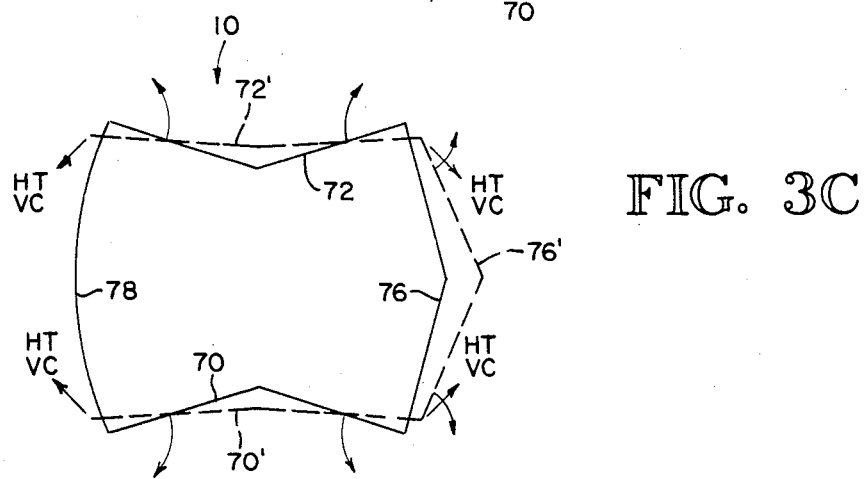

The response of the strain sensor to nonisotropic strains is illustrated in FIG. 3C. The response of the sensor 10 is shown in response to horizontal tension and vertical compression strains which would occur if the strain sensor were place on a vertical structural member carrying a load, since increases in the load produce vertical comprssion and horizontal tension. The horizontal tension and vertical tension produce the stress vectors at each corner, as illustrated in FIG. 3C. The compression applied to the interconnecting leg 76 has a tendency to increase the outward curvature of interconnecting leg 76 to the position 76'. Thus, the upper portion of the interconnecting leg tends to pivot counterclockwise, while the lower portion of the leg 76 tends to pivot in a clockwise direction. At the same time, the tensional strains applied to the inwardly curved legs 70, 72 have a tendency to straighten the legs 70,72 to the positions 70', 72', respectively. As a result, the right-hand portion of interconnecting leg 72 tends to pivot in a clockwise direction, while the right-hand portion of the leg 70 tends to pivot in a counterclockwise direction. It is thus seen that the corner piece at the upper right-hand corner of the sensor formed by the right-hand portion of leg 72 and the upper portion of leg 76 receives opposed moments. However, the rigidity of the corner piece maintains the angular relationship between the leg 72 and the leg 76 constant. The moment tending to pivot interconnecting leg 76 in a counterclockwise direction thus counteracts the moment tending to pivot the interconnecting leg 72 in the clockwise direction. The same phenomena occurs at all four corners of the sensor in the same manner. Thus, the structural rigidity of the corner pieces prevents the strain sensor 10 from deforming to the position illustrated in phantom in FIG. 3C. Instead, the strain sensor 10 remains in its unstrained condition, shown in solid lines in FIG. 3C. Consequently, the beam 78 remains in its undeflected condition so that the sensor 10 is insensitive to nonisotropic strains.

Although the embodiment illustrated in FIGS. 1-3 utilizes four mounting points and four interconnecting legs, it will be under stood that other numbers of mounting points and interconnecting legs may be used. What is important, however, is that at least one interconnecting leg curve in a direction opposite that of an adjacent interconnecting leg in order to generate a rotational moment at the corner piece formed by those interconnecting legs. Preferably, however, the beam on which the strain gauges are mounted should curve in a direction that is opposite the direction of curvature of the adjoining interconnecting legs. As a result, the adjacent interconnecting legs apply opposite and preferably equal bending moments to the ends of the beam.

Figure 4:
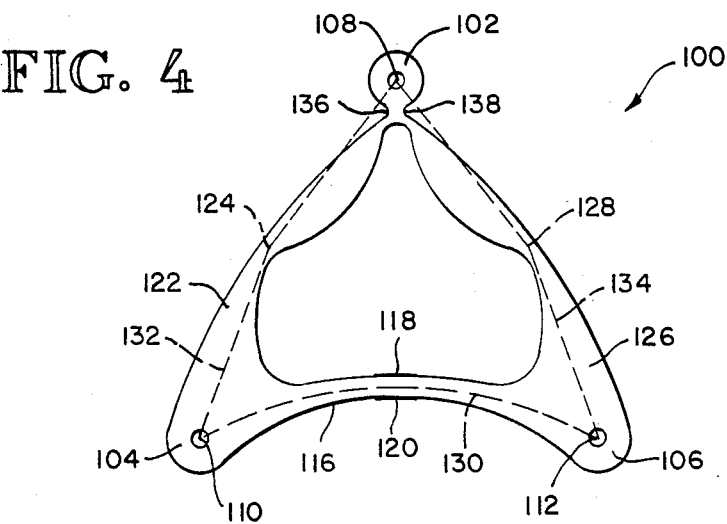
FIG. 4 is an isometric view illustrating one embodiment of the strain sensor employing three mounting points.
Figure 5:
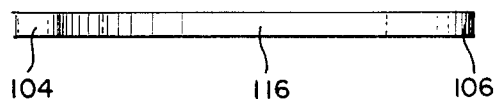
FIG. 5 is a side elevational view of the strain sensor of FIG. 3.

One embodiment of a strain sensor 100 utilizing three mounting points is illustrated in FIGS. 4 and 5. The sensor 100 includes three mounting pads 102-106 in which are formed respective mounting holes 108-112. A measurement beam 116 extends between the mounting pads 104-106. Opposite surfaces of the beam 116 are instrumented with strain gauges 118,120 of conventional design. The mounting pads 104-108 are connected to each other through an interconnecting leg 122 having a flexure hinge 124 formed at its midpoint. Similarly, the mounting pads 102,106 are connected to each other by an interconnecting leg 126 having a flexure hinge 128 formed at its midpoint. In so far as the beam 116 curves inwardly, as schematically illustrated by line 130, the interconnecting legs 122,126 curve outwardly, as illustrated schematically by respective lines 132,134. It will be understood, however, as with the embodiment of FIGS. 1-3, each of the interconnecting legs 122, 126 and the measurement beam 116 could curve in opposite directions.

In the embodiment of FIGS. 1-3, inwardly curving interconnecting legs alternated with the outwardly curving beam and interconnecting leg. In the embodiment of FIGS. 4 and 5, the odd number of interconnecting legs and beam inherently precludes all interconnecting legs and the beam from curving in a direction opposite the direction of curvature of the adjacent interconnecting legs or beam. Insofar as two adjacent interconnecting legs curving in the same direction (i.e., both outwardly or both inwardly) generate moments on a corner piece acting in opposite directions, the corner piece between these interconnecting legs must be modified to permit such movement. Accordingly, in the embodiment of FIGS. 4 and 5, flexure hinges 136,138 are formed at the ends of respective interconnecting legs 122,126 adjacent the mounting pad 102.

Figure 6A:
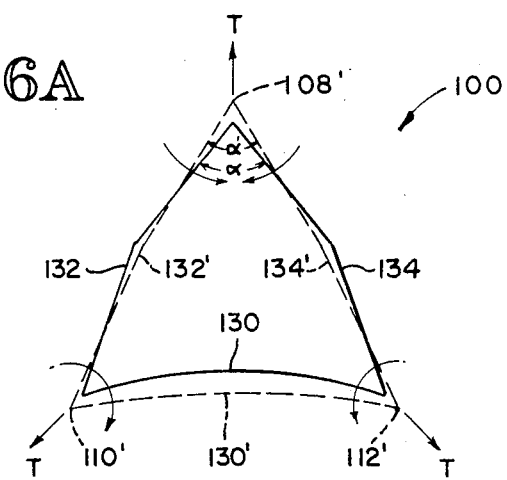
FIGS. 6A-C are a schematic illustrating the deflection of the strain sensor of FIG. 4 for isotropic and nonisotropic strains.

The effect of the flexure hinges 136,138 is apparent from the deflection characteristics of the sensor 100 responsive to a tensional strain, as illustrated in FIG. 6A. Tensional strains applied to the sensor 100 displace the mounting points 108'-112'. The tension applied to the interconnecting legs 132,134 reduces the curvature of the interconnecting legs 132,134. As a result, the interconnecting legs 132,134 deflect inwardly to the position 132',134' illustrated in FIG. 6A. This has the effect of increasing the angle between the interconnecting legs 132,134 adjacent the mounting point 108' from $\alpha$ to $\alpha$. However, unlike the embodiment of FIGS. 1-3, in which the structural rigidity of each corner piece prevents the angles between adjacent interconnecting legs from varying, the flexure hinges 136,138 (FIG. 4) allow adjacent interconnecting legs to pivot freely. The tension applied to the sensor 100 also applies a clockwise rotational moment to the corner piece at the lower left-hand corner and a counterclockwise rotational moment to the corner piece at the lower right-hand corner of the sensor 100. These opposed moments applied to the ends of the beam 130 deflect the beam 130 to the position 130' thereby indicating a tensional strain.

Figure 6B:
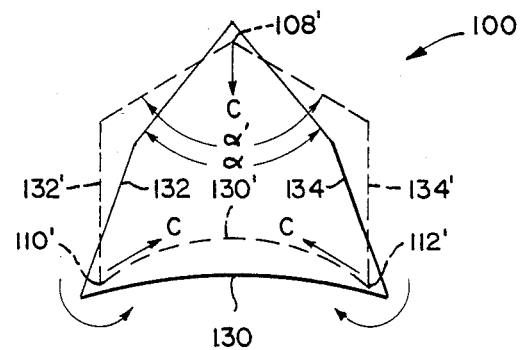

The response of the sensor 100 to a compressional strain is illustrated in FIG. 6B. The inward movement of the mounting points 108-112 causes the interconnecting legs 132,134 to bow outwardly. This causes the angle $\alpha$ at the intersection between legs 132,134 to increase to the position $\alpha$. At the same time, the compression causes the inward curvature of the beam 130 to increase, which, in combination with the increasingly outward bending of the interconnecting legs 132,134, generates a counterclockwise moment at the lower left-hand corner and a clockwise moment at the lower right-hand corner of the sensor 100. The incresed deflection of the beam 130 is thus an indication of compressional strain.

Figure 6C:
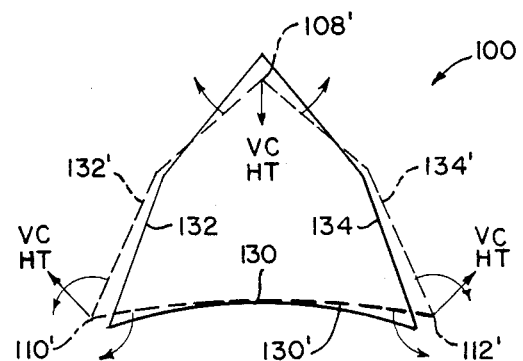

The response of the isotropic strain sensor 100 to nonisotropic strains is illustrated in FIG. 6C. The sensor 100 is shown in FIG. 6C undergoing vertical compression and horizontal tension, such as would exist in a vertical structural member receiving an increasing vertical load. The resultant strain vectors are shown at each mounting point 108-112. The vertical compression applied to the interconnecting legs 132,134 tends to cause the legs 132, 134 to bow outwardly to the respective positions 132',134' in the same manner as illustrated in FIG. 6B. As a result, the lower portion of interconnecting leg 132 tends to pivot in a counterclockwise direction, as illustrated in FIG. 6B, while the lower portion of the interconnecting leg 134 tends to pivot in a clockwise direction in the same manner as in FIG. 6B. At the same time, the horizontal tension applied to the beam 130 attempts to reduce the inward curvature of the beam 130 in the same manner as illustrated in FIG. 6A. As a result, the left-hand end of the beam 130 tends to pivot in a clockwise direction while the right-hand portion of the beam 130 tends to pivot in a counterclockwise direction.

In the same manner as illustrated in FIG. 3C, the structural rigidity of the lower corner pieces prevents the beam 130 and adjacent interconnecting legs 132, 134 from pivoting with respect to each other. This is in contrast to the use of flexure hinges 136, 138 in the upper corner piece adjacent the mounting point 108, which allows relative pivotal movement between adjacent interconnecting legs 132,134. The structural rigidity of the lower corner pieces thus prevents the sensor 100 from deforming to the position illustrated in phantom in FIG. 6C. As a result, the sensor 100 retains its original shape when exposed to non-isotropic strains so that the sensor is sensitive to such strains.

The isotropic strain sensor, including the embodiments of FIGS. 1-6, do not provide a linear output, i.e., an output that is a linear function of the isotropic strain. Instead, the change in output for a given change in strain decreases with decreasing curvature of the beams 40, 130 and increases with increasing curvature of the beams 40, 130. This nonlinear characteristic, while in some respects undesirable, is nevertheless highly useful for certain specialized applications. And, the output of the sensors 10,100 can be linearized with conventional microprocessor technology.

One specialized application for the nonlinear isotropic strain sensors, including the embodiments of FIG. 1-6, is for a load cell utilizing a circular plate as its strain-sensing member. When loads are applied between the outer circumference and the center of a circular plate, the strain in the plate is a nonlinear function of the applied load. In other words, the change in strain in the plate for a given change in load decreases with increasing curvature of the plate. This characteristic is the exact opposite of the inventive strain sensor, in which the rate of change of the output decreases with increasing strain. As a result, use of the inventive isotropic strain sensor on a load cell employing a circular plate as its load-bearing member results in a load cell having a linear output, i.e., an output that is a linear function of the applied load.

Figure 7:
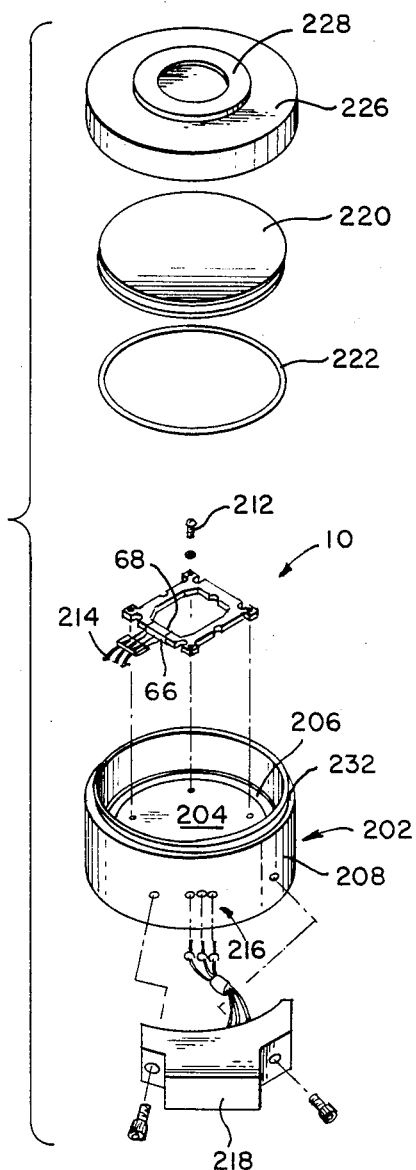
FIG. 7 is an exploded isometric view of a load cell employing the isotropic strain sensor of FIGS. 1-6.
Figure 8:
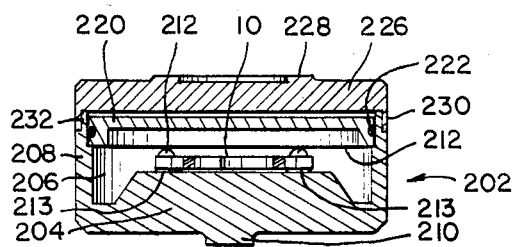
FIG. 8 is an axial cross-sectional view of the load cell of FIG. 7.

One embodiment of a load cell employing a circular plate as its load-bearing element is illustrated in FIGS. 7 and 8. The load cell 200 includes a body 202 formed by a circular plate 204 surrounded by an annular recess 206 and an upwardly projecting sidewall 208. The downward projection 210 formed at the center of the disc 204 spaces the lower surface of the disc 204 above a support surface (not shown). Compressive forces exerted in a downward direction on the rim 208 and in an upward direction on the projection 210 thus strain the disc 204 in a nonlinear manner. The strain sensor 10, such as the embodiment in FIGS. 1-3, is then mounted on the disc 204 at its center by screws 212. The screws 212 extend through respective spacing washers 213, which space the strain sensor 10 above the disc 204. This spacing prevents the sensor 10 from frictionally sliding on the disc 10. Electrical leads 214 connected to the strain gauges 66,68 strain through respective apertures 216 in the rim 208 and into a connector block 218. The connector block contains an electrical connector (not shown) of conventional design. The sensor 10 may be covered by a circular protective plate 220 having an annular O-ring 222 surrounding its periphery. The lower surface of the plate 220 is hollowed out to provide clearance between the plate 220 and sensor 10. The plate 220 is placed inside the body 202, with the O-ring 22 contacting the inner surface of the rim 208. The plate 220 and O-ring 222 thus protect the sensor 10 from moisture and dirt, but it otherwise does not affect the operation of the load cell. As a result, the plate 220 and O-ring 222 may be eliminated in many applications.

The final element of the load cell is a circular cover 226 having an annular spacing ring 228 formed on its upper surface. As best illustrated in FIG. 8, the cover 226 has a downwardly depending rim 230 which mates with an annular recess 232 formed along the upper outside edge of the body 202.

In operation, the load cell may be placed at one end of a structural member so that it is compressively loaded. This compressive loading applies a downward force to the annular spacing ring 228 of the cover 226 and anupward force to the disc 204 through the projection 210. The upward force applied through the projection 210 is applied directly to the center of the disc 204. The downward force applied to the annular spacing ring 228 is applied to the outer periphery of the disc 204 through the cover 226, rim 230 and rim 208.

The low profile and compact configuration of the load cell 200 make it ideal for a wide variety of weighing applications. It will be understood, however, that the isotropic strain sensors, such as the embodiments of FIGS. 1-6, can also be used in a variety of applications other than in the load cell illustrated in FIGS. 7 and 8. Also, the load cell of FIGS. 7 and 8 may be implemented in forms other than the embodiment of FIGS. 7 and 8 as long as a compressive or tensional stress is applied between the center of a plate and a line surrounding the center of the plate.

I claim:

1. An isotropic strain sensor, comprising:
at least three corner members having respective mounting points, said corner members being interconnected by respective curved legs, with the legs connecting at least one of said corner members to adjacent corner members curving in opposite directions from each other so that said legs deflect in opposite directions responsive to isotropic movement of said corner members, thereby rotating said one corner member; and
a strain-sensing element mounted on at least one of said legs to provide an electrical indication of the deflection thereof.

2. The isotropic strain sensor of claim 1 wherein said strain-sensing element is mounted on a leg that curves in a direction opposite the direction of curvature of the adjacent legs.

3. The isotropic strain sensor of claim 2 wherein the interconnecting leg that said strain-sensing element is mounted on is a measurement beam.

4. The isotropic strain sensor of claim 1 wherein said corner members and interconnecting legs are three in number, with the first and second legs curving in one direction and a third leg curving in the opposite direction.

5. The isotropic strain sensor of claim 4 wherein said strain-sensing element is mounted on said third leg.

6. The isotropic strain sensor of claim 5 wherein said third leg is a measurement beam.

7. The strain sensor of claim 4 wherein the corner member connected to said first and third interconnecting legs and the corner member connected to said second and third interconnecting legs are relatively rigid so that they rotate as a unit as said interconnecting legs deflect responsive to isotropic movement of said mounting points while the corner member connected to said first and second interconnecting legs is relatively flexible about its mounting point so that portions of said corner member on opposite sides of said mounting point are free to deflect in opposite directions as said interconnecting legs deflect responsive to isotropic movement of said mounting points.

8. The isotropic strain sensor of claim 1 wherein said corner members and interconnecting legs are four in number, with each corner member being connected to a pair of interconnecting legs deflecting in opposite directions.

9. The isotropic strain sensor of claim 1 wherein a strain-sensing member is mounted on less than all of said interconnecting legs and wherein a flexure hinge is formed at the midpoint of each interconnecting leg that is without a strain-sensing member mounted thereon.

10. A load cell, comprising:
a disc of resilient material having opposed faces, said disc being adapted to receive opposed axial forces between the center of said disc on one face thereof and a peripheral support symmetrically spaced from the center of said disc on the opposite face thereof, said disc being mounted on said support with relative freedom of movement so that said disc has a deflection characteristic that is a nonlinear function of the magnitude of the force applied thereto; and
an isotropic strain sensor mounted at the center of said disc on one face thereof, said strain sensor generating an electrical output having a characteristic that is a nonlinear function of the isotropic strain applied to said strain sensor by said disc, the nonlinear function of said strain sensor compensating for the nonlinear function of said disc so that said strain sensor generates an output that is a relatively linear function of the magnitude of the load applied to said disc.

11. The load cell of claim 10 wherein the opposed faces of said disc are circular and said forces are applied between the center of said disc on one face thereof and a circumference of said disc on the opposite face thereof.

12. The load cell of claim 10 wherein said disc comprises a generally cylindrical body having a spacer positioned at the center of said body on the face opposite the face on which said strain sensor is mounted, and a rim surrounding at least a portion of said body and extending axially away from said spacer, said load cell further including a load-bearing member having a rim extending toward and connected to the rim of said disc so that said strain sensor is surrounded by one of said rims while an opposed force applied between the spacer of said disc and said load-bearing member is coupled to said disc by said rims.

13. The load cell of claim 12 wherein a circumferential groove is formed in the face of said disc on which said strain sensor is mounted to reduce the thickness of said disc along a circular ring, thereby maximizing the deflection of said disc along said ring.

14. The load cell of claim 10 wherein said strain sensor comprises:
at least three corner members having respective mounting points through which said corner members are secured to said disc, said corner members being interconnected by respective curved legs, with the legs connecting at least one of said corner members to adjacent corner members curving in opposite directions from each other so that said legs deflect in opposite directions responsive to isotropic movement of said disc, thereby rotating said one corner member; and
a strain-sensing element mounted on at least one of said interconnecting legs to provide an electrical indication of the deflection thereof.

15. The load cell of claim 14 wherein said strain-sensing element is mounted on an interconnecting leg that curves in a direction opposite the direction of curvature of the adjacent interconnecting legs.

16. The load cell of claim 14 wherein said corner members and interconnecting legs are three in number, with first and second interconnecting legs curving in one direction and a third interconnecting leg curving in the opposite direction.

17. The load cell of claim 16 wherein said strain-sensing element is mounted on said third interconnecting leg.

18. The load cell of claim 16 wherein the corner member connected to said first and third interconnecting legs and the corner member connected to said second and third interconnecting legs are relatively rigid so that they rotate as a unit as said interconnecting legs deflect responsive to isotropic strain in said disc, while the corner member connected to said first and second interconnecting legs is relatively flexible so that portions of said corner member on opposite sides of said mounting point are free to deflect in opposite directions as said interconnecting legs deflect responsive to isotropic strain in said disc.

19. The load cell of claim 14 wherein said corner members and interconnecting legs are four in number, with each corner member being connected to a pair of interconnectig legs that deflect in opposite directions.

20. The load cell of claim 14 wherein a strain-sensing member is mounted on less than all of said interconnecting legs and wherein a flexure hinge is formed at the midpoint of each interconnecting leg that is without a strain-sensing member mounted thereon.

* * * * *